(12) United States Patent
Kubota et al.

(10) Patent No.: US 11,042,013 B2
(45) Date of Patent: Jun. 22, 2021

(54) PROJECTION OPTICAL SYSTEM AND IMAGE PROJECTION DEVICE

(71) Applicant: Ricoh Company, Ltd., Tokyo (JP)

(72) Inventors: Takashi Kubota, Tokyo (JP); Hibiki Tatsuno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 75 days.

(21) Appl. No.: 15/944,895

(22) Filed: Apr. 4, 2018

(65) Prior Publication Data

US 2018/0299653 A1  Oct. 18, 2018

(30) Foreign Application Priority Data

Apr. 12, 2017 (JP) ............................. JP2017-078709

(51) Int. Cl.
*G02B 13/16* (2006.01)
*G02B 9/64* (2006.01)

(52) U.S. Cl.
CPC ............... *G02B 13/16* (2013.01); *G02B 9/64* (2013.01)

(58) Field of Classification Search
CPC .................................. G02B 13/16; G02B 9/64
See application file for complete search history.

(56) References Cited

U.S. PATENT DOCUMENTS

| | | | | |
|---|---|---|---|---|
| 5,159,496 A * | 10/1992 | Kataoka | ................. | G02B 13/14 |
| | | | | 359/754 |
| 8,721,094 B2 * | 5/2014 | Tanaka | ................... | G02B 1/115 |
| | | | | 359/601 |
| 9,746,652 B2 | 8/2017 | Kubota | | |
| 2004/0184160 A1 | 9/2004 | Nishina et al. | | |
| 2005/0111115 A1 | 5/2005 | Tatsuno et al. | | |
| 2005/0185288 A1 | 8/2005 | Nishina et al. | | |
| 2005/0195492 A1 | 9/2005 | Nishina et al. | | |
| 2005/0195493 A1 | 9/2005 | Nishina et al. | | |
| 2007/0024977 A1 | 2/2007 | Kawamura et al. | | |
| 2011/0128637 A1 | 6/2011 | Kubota | | |
| 2011/0141536 A1 | 6/2011 | Tatsuno | | |
| 2011/0199690 A1 | 8/2011 | Lee et al. | | |

(Continued)

FOREIGN PATENT DOCUMENTS

| | | |
|---|---|---|
| JP | S56-62215 A | 5/1981 |
| JP | S62-177509 A | 8/1987 |

(Continued)

OTHER PUBLICATIONS

Office Action dated Dec. 1, 2020 in Japanese Patent Application No. 2017-078709, 5 pages.

*Primary Examiner* — Joseph P Martinez
*Assistant Examiner* — Vipin Patel
(74) *Attorney, Agent, or Firm* — Xsensus LLP

(57) ABSTRACT

A projection optical system is for an image projection device. The projection optical system includes a whole lens system of seven to nine lenses and an aperture stop. The seven to nine lenses are all single lenses. One negative lens and one or two positive lenses are located on a magnifying side with respect to the aperture stop. Two negative lenses and three or four positive lenses are located on a reducing side with respect to the aperture stop. A lens adjacent to the magnifying side of the aperture stop and a lens adjacent to the reducing side of the aperture stop are both a negative lens.

8 Claims, 6 Drawing Sheets

(56) References Cited

U.S. PATENT DOCUMENTS

| | | |
|---|---|---|
| 2011/0310450 A1 | 12/2011 | Amada et al. |
| 2011/0310496 A1 | 12/2011 | Kubota et al. |
| 2011/0317285 A1 | 12/2011 | Ohashi et al. |
| 2012/0147485 A1 | 6/2012 | Kubota |
| 2012/0154768 A1 | 6/2012 | Tatsuno |
| 2012/0162753 A1 | 6/2012 | Tatsuno |
| 2013/0070217 A1 | 3/2013 | Tatsuno |
| 2013/0107232 A1 | 5/2013 | Tatsuno |
| 2013/0107233 A1 | 5/2013 | Hirakawa et al. |
| 2013/0107234 A1 | 5/2013 | Nishina et al. |
| 2013/0114053 A1 | 5/2013 | Tatsuno et al. |
| 2013/0135514 A1* | 5/2013 | Maetaki .......... G02B 9/04 348/340 |
| 2013/0194488 A1 | 8/2013 | Kubota et al. |
| 2013/0194681 A1 | 8/2013 | Ohashi et al. |
| 2013/0308105 A1 | 11/2013 | Kubota |
| 2014/0016214 A1 | 1/2014 | Kubota et al. |
| 2014/0063612 A1 | 3/2014 | Kubota |
| 2014/0126045 A1 | 5/2014 | Tatsuno et al. |
| 2014/0126072 A1 | 5/2014 | Ohashi et al. |
| 2014/0139931 A1 | 5/2014 | Kubota |
| 2014/0146295 A1 | 5/2014 | Tatsuno |
| 2014/0185143 A1 | 7/2014 | Kubota |
| 2014/0185144 A1 | 7/2014 | Kubota |
| 2014/0218699 A1 | 8/2014 | Tatsuno |
| 2014/0340658 A1 | 11/2014 | Takano et al. |
| 2014/0340768 A1 | 11/2014 | Kubota et al. |
| 2015/0029474 A1 | 1/2015 | Tatsuno |
| 2015/0062696 A1 | 3/2015 | Tatsuno et al. |
| 2015/0138518 A1 | 5/2015 | Tatsuno |
| 2015/0138625 A1 | 5/2015 | Tatsuno |
| 2015/0138649 A1 | 5/2015 | Kubota |
| 2015/0234158 A1 | 8/2015 | Tatsuno et al. |
| 2016/0054544 A1 | 2/2016 | Ohashi et al. |
| 2016/0077420 A1 | 3/2016 | Tatsuno |
| 2016/0103304 A1 | 4/2016 | Takano et al. |
| 2016/0231542 A1 | 8/2016 | Tatsuno et al. |
| 2017/0059971 A1 | 3/2017 | Takano et al. |
| 2017/0064268 A1 | 3/2017 | Shibayama et al. |
| 2017/0176729 A1 | 6/2017 | Kubota |
| 2017/0219806 A1 | 8/2017 | Kubota |
| 2017/0242226 A1 | 8/2017 | Kubota |
| 2018/0003928 A1 | 1/2018 | Tatsuno et al. |
| 2018/0003934 A1 | 1/2018 | Takano et al. |
| 2018/0003964 A1 | 1/2018 | Tatsuno |
| 2018/0074302 A1 | 3/2018 | Takano et al. |

FOREIGN PATENT DOCUMENTS

| | | |
|---|---|---|
| JP | S62-195617 A | 8/1987 |
| JP | H02-118507 A | 5/1990 |
| JP | H10-221601 A | 8/1998 |
| JP | 2003-185916 A | 7/2003 |
| JP | 2007-333790 A | 12/2007 |
| JP | 2008-176261 A | 7/2008 |
| JP | 2010-249946 | 11/2010 |
| JP | 2011-107313 A | 6/2011 |
| JP | 2011-170309 | 9/2011 |
| JP | 2012-189637 A | 10/2012 |
| JP | 2012-226309 A | 11/2012 |
| JP | 5199148 | 2/2013 |
| JP | 5210196 | 3/2013 |
| JP | 2013-218015 A | 10/2013 |
| JP | 2014-021309 | 2/2014 |
| JP | 2016-57518 A | 4/2016 |

* cited by examiner

PROJECTION OPTICAL SYSTEM AND IMAGE PROJECTION DEVICE

CROSS-REFERENCE TO RELATED APPLICATIONS

The present application claims priority under 35 U.S.C. § 119 to Japanese Patent Application No. 2017-078709, filed on Apr. 12, 2017. The contents of which are incorporated herein by reference in their entirety.

BACKGROUND OF THE INVENTION

1. Field of the Invention

The present invention relates to a projection optical system and an image projection device.

2. Description of the Related Art

In recent years, projection technologies have been developed widely not only to front projection projectors but also to signage and head-up displays (HUD) mounted on vehicles, the market and field of projection technologies have expanded, and size reduction and high luminance of image projection devices have been promoted.

In order to reduce the size of image projection devices, size reduction of projection optical systems have been also promoted (Japanese Patent No. 5199148, Japanese Patent No. 5210196, Japanese Unexamined Patent Application Publication No. 2011-170309, Japanese Unexamined Patent Application Publication No. 2010-249946, and Japanese Unexamined Patent Application Publication No. 2014-021309) and size reduction, weight reduction, and high luminance have been promoted also for reflection display devices (such as DMDs) and liquid crystal display devices that are used as image display devices that display images to be projected; however, reducing the size of an image display device causes local concentration of the amount of light and thus it is required that lenses that form a projection optical system has high light resistance and that the optical properties do not change largely depending on the temperature change.

SUMMARY OF THE INVENTION

According to an embodiment, a projection optical system is for an image projection device. The projection optical system includes a whole lens system of seven to nine lenses and an aperture stop. The seven to nine lenses are all single lenses. One negative lens and one or two positive lenses are located on a magnifying side with respect to the aperture stop. Two negative lenses and three or four positive lenses are located on a reducing side with respect to the aperture stop. A lens adjacent to the magnifying side of the aperture stop and a lens adjacent to the reducing side of the aperture stop are both a negative lens.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
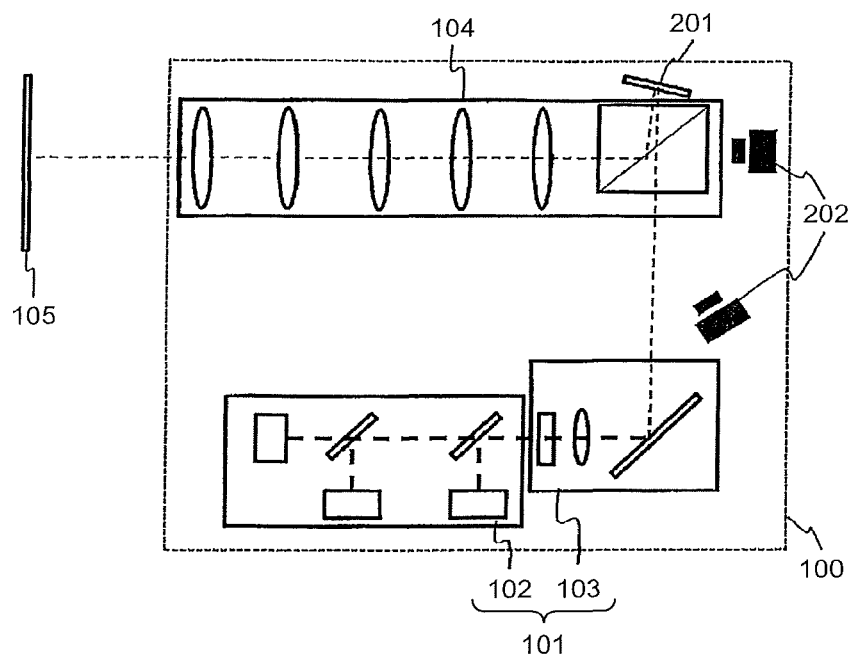
FIG. 1 is a configuration diagram illustrating an embodiment of the image projection device according to the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the projection optical system and the image projection device according to the present invention will be described below with reference to the accompanying drawings.

An embodiment has an object to realize a new projection optical system that has resistance to the light intensity and temperature change.

Image Projection Device

As illustrated in FIG. 1, an image projection device 100 includes an illumination optical system 101, a projection optical system 104 and an image display device 201. The dashed line in FIG. 1 represents the optical axis. A power supply, a cooling device, a signal processor, etc., are mounted to form an image projection device that performs image projection according to external signal inputs.

Attaching a reflecting mirror, such as a turning mirror, and a magnifying-reducing optical system as attachments to the image projection device enables the image projection device to be applicable and developable to HUDs, etc. For example, it is possible to mount the image projection device to, for example, a vehicle, a motorcycle, or an aircraft.

The illumination optical system 101 includes a light source 102 and a relay optical system 103. The light source 102 includes LED RGB light sources. Alternatively, a halogen lamp or a laser light source may be used.

The beams from the respective light sources of the light source 102, which are the RGB light sources, are synthesized into a single bundle of light via the turning mirror and a dichroic mirror and the light bundle is incident on the relay optical system 103.

The relay optical system 103 includes a fly-eye lens, a condenser lens, a field lens and a turning mirror and equalizes the RGB light source ununiformity in the light bundle incident from the light source 102. The light bundle emitted from the relay optical system 103 passes through the prism of the projection optical system 104 and is incident on the image display device 201.

In the described example, the image display device 201 is a reflective image display device, such as the DMD; however, the embodiment is not limited thereto and a transmission type image display device of may be used depending on the layout.

Each color of the RGB light sources is emitted from the illumination optical system 101 to the image display device 201 such that each color is turned on and off at every nanosecond to few milliseconds. At the timing of allying the light bundle of each color, an image displayed on the image display device 201 is controlled. The reflected light bundle of a color image that is reflected by the image display device 201 is magnified by the projection optical system 104 and is projected onto a screen 105 that is a projection surface.

The three RGB light sources are used, and a method of using a color wheel as a single light source also enables reproduction of the colors of a color image.

A light amount detection device 202 is a device that detects the amount and color of emitted light. It is possible to connect the light amount detection device 202 to a microcomputer, or the like, and, according to information that is detected, automatically control the amount and color of the light projected on the screen 105.

The image projection device 100 includes a collimator lens and a field lens of the illumination optical system and thus it is necessary to keep a relatively large area to arrange the lenses. Because of the relationship about the space for arranging the projection optical system 104 and the illumination optical system 101 of the image projection device 100, it is necessary to keep a back focus of the projection optical system 104 to some extent and reduce the diameter of the lens on the side of the image display device.

Using the projection optical system according to the present invention as the projection optical system 104 makes it possible to obtain an image projection device capable of reducing the change in high performance, light resistance, and the optical performance at the time when the temperature changes.

Projection Optical System

First Embodiment

The projection optical system according to the first embodiment is a projection optical system for an image projection device and includes a lens system including seven to nine lenses and an aperture stop.

The seven to nine lenses are all single lenses and do not include any cemented lens.

One negative lens and one or two positive lenses are located on the magnifying side with respect to the aperture stop. Two negative lenses and three or four positive lenses are located on the reducing side with respect to the aperture stop.

The lens adjacent to the magnifying side and the lens adjacent to the reducing side of the aperture stop are both negative lenses. Lenses L1-L2-L3 are on magnifying side with respect to the aperture stop, and lenses L4-L5-L6-L7-L8-L9 are on reducing side with respect to the aperture stop.

As described above, in the projection optical system of the present invention, the whole lens system includes the single lenses and does not include any cemented lens. When a cemented lens is used, the light resistance of a cementation resin to cement the lenses is a matter; however, the projection optical system of the present invention does not include any cemented lens and thus has high light resistance.

One negative lens and one or two positive lenses are located on the magnifying side with respect to the aperture stop, two negative lenses and three or four positive lenses are located on the reducing side with respect to the aperture stop, and accordingly it is possible to effectively control the spherical aberration and astigmatism to keep the spherical aberration and astigmatism small effectively.

The lenses adjacent to the magnifying side and the reducing side of the aperture stop are both negative lenses and symmetrical shapes of the negative lenses (concave with respect to the aperture stop) enable effective reduction of the chromatic aberration of magnification and distortion.

Arranging the two negative lenses on the reducing side with respect to the aperture stop makes it possible to keep the "variation of the focal point position that occurs in accordance with the change of the intervals among the lenses at the time when the temperature changes" small.

Second Embodiment

A projection optical system according to a second embodiment satisfies the following Conditional Expression (1) with respect to a distance T (mm) from the surface on the magnifying side, of the lens on the most magnifying side, to a projection surface, that is, a screen and a diagonal size S (mm) of a projection image that is projected onto the projection surface in the projection optical systems according to the first embodiment.

$$0.2 < S/T < 0.6 \tag{1}$$

When the lower limit of Conditional Expression (1) is exceeded, the projection size increases and the optical performance tends to lower. When the upper limit of Conditional Expression (1) is exceeded, the optical performance improves but the projection size reduces. As long as the condition (1) is satisfied, the projection distance and the projection size are balanced and thus it is possible to project a projection image having a proper size in a proper projection distance.

Third Embodiment

A projection optical system according to a third embodiment satisfies the following Conditional Expression (2) with respect to an angle-of-view ω of the magnifying side in the projection optical systems according to the first or second embodiment.

$$2\omega<25 \text{ degrees} \tag{2}$$

Condition (2) is a condition realizing high optical performance. Satisfying Condition (2) particularly makes it possible to correct the distortion. The distortion tends to increase outside the range of Condition (2).

Fourth Embodiment

A projection optical system according to a fourth embodiment satisfies the following Conditional Expression (3) with respect to a focal length F1 (mm) of a group of the lenses of the magnifying side with respect to the aperture stop in the projection optical systems according to the first to third embodiments.

$$1/|F1|(1/\text{mm})<2.0E-2 \tag{3}$$

When the magnifying side with respect to the aperture stop has a positive or negative power and the reducing side with respect to the aperture stop has a positive power, satisfying Condition (3) makes it possible to reduce the production error sensitivity.

When Condition (3) is satisfied, the power of the magnifying side with respect to the aperture stop is low and the absolute value of the focal length |F1| (mm) 50 mm or larger is and, even in the case where the lens group of the magnifying side with respect to the aperture stop and the lens group of the reducing side with respect to the aperture stop are eccentric, including the case where the projection optical system is in a high-temperature environment, the deterioration of the optical performance is small and the yield increases in the assembly and this is advantageous in cost.

When Condition (3) is not satisfied, the concentric error sensitivity tends to increase and thus it tends to be difficult to increase the yield in assembly.

Fifth Embodiment

A projection optical system according to a fifth embodiment includes a lens on the most magnifying side that is a lens concave with respect to the magnifying side in the projection optical systems according to the first to fourth embodiments. When the surface on the magnifying side, of the lens on the most magnifying side, is concave, a risk that, when the projection optical system is assembled or when the user treats the projection optical system, a hand directly touches the lens on the magnifying side and dirties or damages the lens, is reduced. The concave surface also has an effect that, when the projection optical system is set horizontally, dust is prevented from being accumulated on the lens surface on the most magnifying side.

The projection optical system includes a positive meniscus lens having a concave surface on the most magnifying side. In the projection optical system, the positive meniscus lens effectively corrects the chromatic aberration of magnification and distortion. If the lens is replaced with a convex positive meniscus lens or a bi-convex lens, it is possible to prevent occurrence of the spherical aberration and astigmatism but it is necessary to take the balance of the aberration correction of the whole optical system and the remaining aberration into consideration.

Sixth Embodiment

A projection optical system according to a sixth embodiment satisfies the following Conditional Expression (4) with respect to a radius-of-curvature 2GNR1 on the magnifying side, of the negative lens on the reducing side with respect to the aperture spot and on the most reducing side, and a radius-of-curvature 2GPR2 on the reducing side, of the positive lens on the reducing side with respect to the aperture spot and positioned on the magnifying side with respect to the negative lens on the most reducing side.

$$1.1<2GPR2/2GNR1 \text{ or}$$

$$0.9>2GPR2/2GNR1 \tag{4}$$

On the reducing side with respect to the aperture stop, the surface on the magnifying side, of the negative lens on the most magnifying side, and the surface on the reducing side, of the positive lens adjacent to the magnifying side of the negative lens, tend to have radii of curvature close to each other. The radii of curvature of the surfaces are too close to each other outside the range of Condition (2) and thus reflection between the lens surfaces tend to cause occurrence of a ghost image on a projection image. Satisfying Condition (4) makes it possible to effectively reduce occurrence of a ghost image.

Seventh Embodiment

A projection optical system according to a seventh embodiment satisfies the following Conditional Expression (5) and Conditional Expression (6) with respect to a linear expansion coefficient LPα ($10^{-7}/°$ C.) of a refractive index of the lens L1 on the most magnifying side at 100 to 300° C. and a linear expansion coefficient LCα ($10^{-7}/°$ C.) of a refractive index of the lens on the most reducing side at 100 to 300° C. in the projection optical system according to the first to sixth embodiments.

$$LP\alpha<100(10^{-7}/° \text{ C.}) \tag{5}$$

$$LC\alpha<100(10^{-7}/° \text{ C.}) \tag{6}$$

The lenses forming the projection optical system are arranged in a lens barrel and, in general, the lens on the most magnifying side and the lens on the most reducing side are susceptible to the heat from the external atmosphere or an imaging light bundle. In the lens on the most reducing side, the light bundle density of the imaging light bundle tends to be high and the temperature of the lens tends to be high and, when the coefficient of thermal expansion is large, the lens may break or a crack may occur in the lens.

In general, the lens on the most magnifying side has a large lens system and thus tends to have a large amount of thermal expansion and, when the temperature of an environment in which the projection optical system is used is high, break or a crack may occur in the lens as well.

In order for the lenses to endure an environment of use with a significant temperature change, it is preferable that at least one of Conditions (5) and (6) is satisfied.

In the specific examples to be described below, using "a positive meniscus lens having a concave surface on the magnifying side" as the lens on the most magnifying side, the chromatic aberration of magnification and distortion are effectively corrected.

The lens on the most magnifying side may be a positive meniscus lens that is convex to the magnifying side or a bi-convex lens. This prevents occurrence of spherical aberration and astigmatism but it is necessary to take the balance of aberration correction over the optical system and the remaining aberration into consideration.

Eighth Embodiment

In a projection optical system according to an eighth embodiment, the whole optical system is moved in the direction of the optical axis to perform focus adjustment in the projection optical systems according to the first to seventh embodiments.

An inner focus method, a front focus method, or a rear focus method of moving part of the lenses in the optical system to adjust the focus is applicable to "the focus adjustment" of the projection optical system according to the present invention.

The focus adjustment of moving the whole optical system in the optical direction to adjust the focus has the smallest change in performance when the distance varies and thus is optimum as the focus adjustment method for the projection optical system of the present invention.

EXAMPLE

Five specific examples of the projection optical system of the invention will be given below. In FIGS. 2, 4, 6, 8 and 10, the left direction in the diagrams is the magnifying side and the right direction is the reducing side. In order to avoid complexity, common reference numerals are used among the figures.

Figure 2:
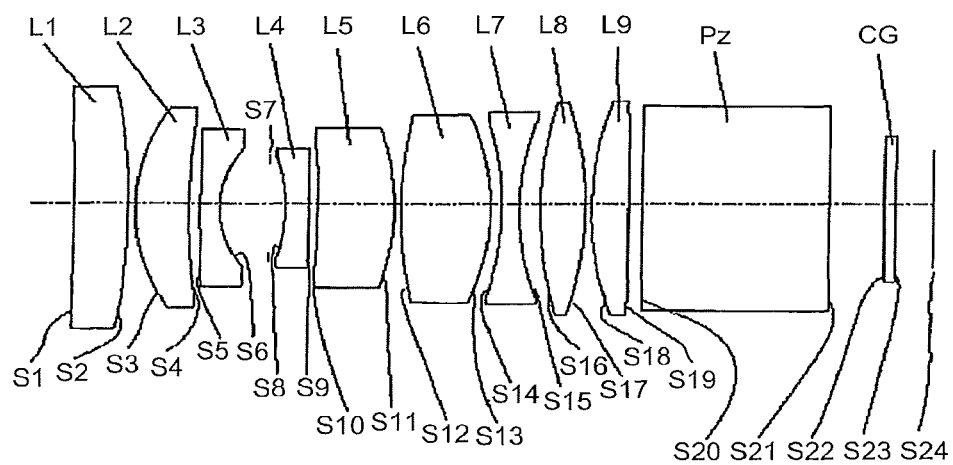
FIG. 2 is an optical arrangement diagram illustrating a configuration of a projection optical system according to Example 1.
Figure 3:
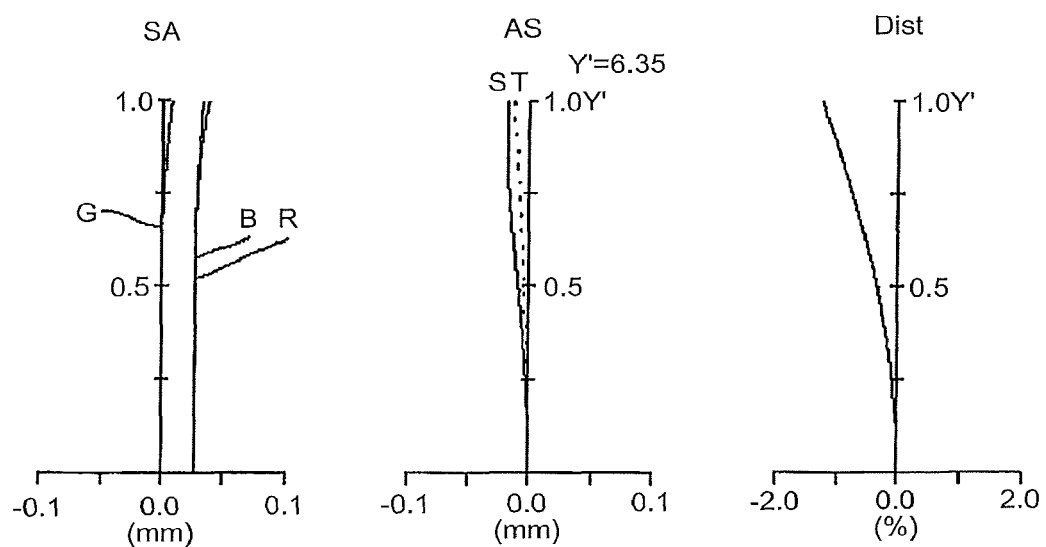
FIG. 3 is an aberration curve diagram representing the spherical aberration (SA), astigmatism (AS) and distortion (Dist) of the projection optical system according to Example 1.
Figure 6:
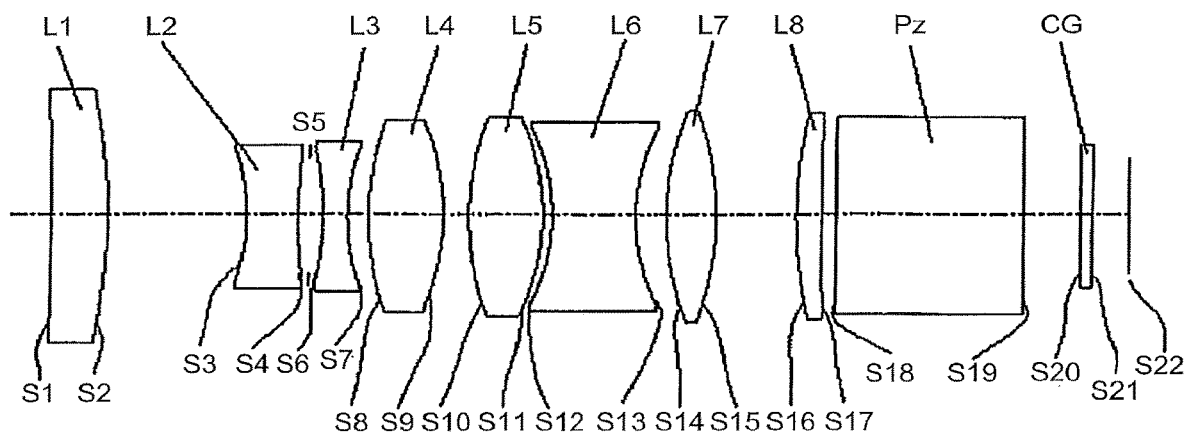
FIG. 6 is an optical arrangement diagram illustrating a configuration of a projection optical system according to Example 3.
Figure 8:
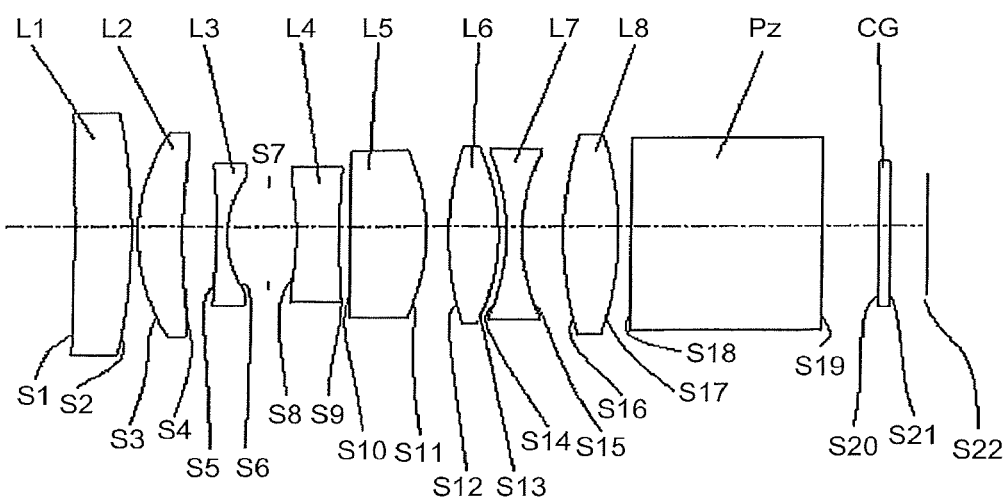
FIG. 8 is an optical arrangement diagram illustrating a configuration of a projection optical system according to Example 4.
Figure 10:
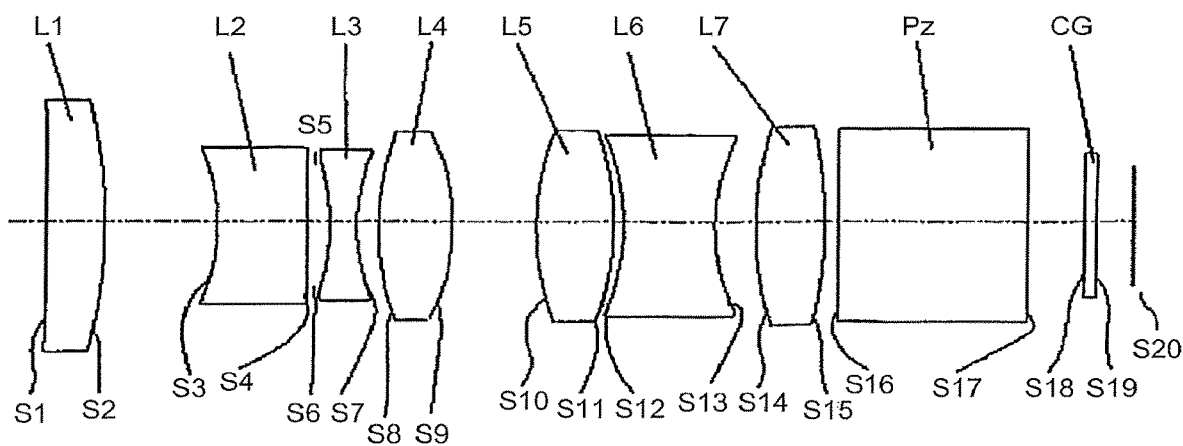
FIG. 10 is an optical arrangement diagram illustrating a configuration of a projection optical system according to Example 5.

In other words, Pz denotes a prism and CG denotes a cover glass of an image display device and an i-th lens from the magnifying side is denoted by Li (i=1 to 9 in FIGS. 2 and 3, i=1 to 9 in FIGS. 6 and 8, and i=1 to 7 in FIG. 10).

Figure 4:
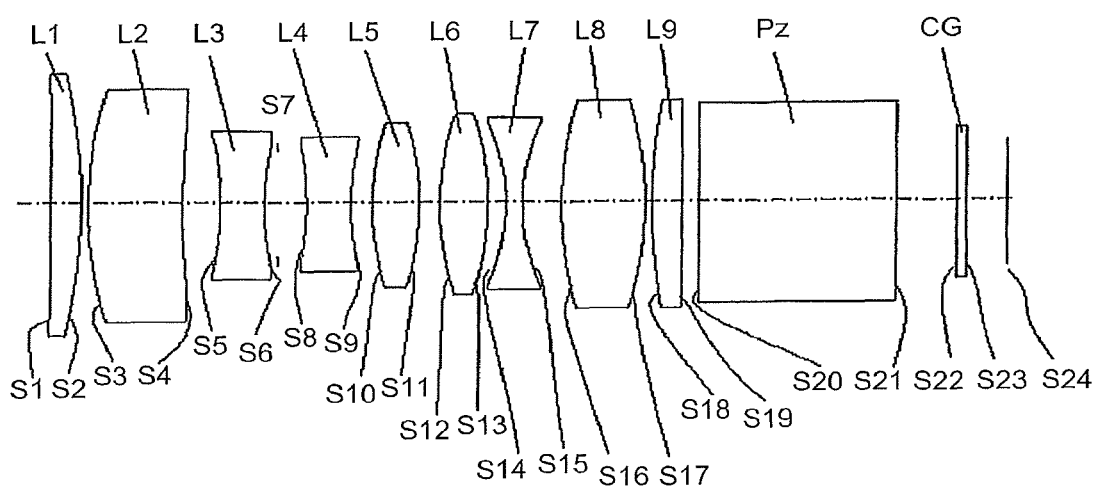
FIG. 4 is an optical arrangement diagram illustrating a configuration of a projection optical system according to Example 2.

The surface number of a j-th surface (the aperture stop, the prism Pz, the cover glass CG, and the image display surface of the image display device) from the magnifying side is denoted by Sj (j=1 to 22 in FIGS. 2 and 4, j=1 to 22 in FIGS. 6 and 8, and j=1 to 20 in FIG. 10).

The meanings of the symbols in the examples are as follows:

F: Focal length of the whole optical system,
Fno: Numerical aperture,
ω: Half angle of view,
R: Radius of Curvature,
D: Interval between surfaces,
Nd: Refractive Index,
vd: Abbe Number,
L: Lens,
f: Focal length of lens, and
FF: Focal length of a group of lenses.

Example 1

As illustrated in FIG. 2, lenses L1 to L9 are arranged sequentially from the magnifying side to the reducing side and an aperture stop is set between the lens L3 and the lens L4. A prism Pz is set on the reducing side with respect to the lens L9 and an image display screen S24 of an image display device is positioned on the reducing side with respect to the prism Pz via a cover glass CG.

The lenses L1 to L9 together with the aperture stop are moved integrally and simultaneously to perform focus adjustment.

The lenses L1 to L3 are arranged on the magnifying side with respect to the aperture stop and the combined refractive power of the lenses L1 to L3 is positive.

In other words, on the magnifying side with respect to the aperture stop, the positive meniscus lens L1 having a concave surface on the magnifying side, the positive meniscus lens L2 having a concave surface on the magnifying side, and the negative meniscus lens L3 having a convex surface on the magnifying side, are arranged sequentially from the most magnifying side.

The lenses L4 to L9 are arranged on the reducing side with respect to the aperture stop and the synthesized refractive power of the lenses L4 to L9 is positive.

In other words, on the reducing side with respect to the aperture stop, the negative meniscus lens L4 having a concave surface on the magnifying side, the positive meniscus lens L5 having a concave surface on the magnifying side, the bi-convex positive lens L6, the bi-concave negative lens L7, the bi-convex positive lens L8, and the bi-convex positive lens L9, are arranged sequentially from the most magnifying side.

On the reducing side with respect to the lens L9, the prism Pz, the cover glass CG of the image display device, and the image display surface (S24) are arranged. The prism Pz plays a role to turn the light path and thus it is possible to reflect the imaging light bundle from the image display device on the prism Pz to cause the imaging light bundle to be incident on and emitted to the projection optical system. It is possible to set, as the prism Pz, a cross prism, a total internal reflection (TIR) prism, a reverse total internal reflection (RTIR) prism, or the like, according to the type of the display device.

The lenses L1 to L9 are all single spherical lenses and there is no cemented lens.

Each numerical value of Example 1 is represented in Table 1, where S denotes a surface number.

TABLE 1

F = 31.0 mm, Fno = 2.2, ω = 11.7°

| S | R | D | Nd | vd | L | f | FF |
|---|---|---|----|----|----|----|----|
| 1 | −340.48 | 6.0 | 1.80400 | 46.58 | L1 | 88.3 | 339.5 |
| 2 | −59.653 | 0.7 | | | | | |
| 3 | 18.415 | 5.67 | 1.80400 | 46.58 | L2 | 29.5 | |
| 4 | 69.164 | 1.24 | | | | | |
| 5 | 649.97 | 2.06 | 1.59551 | 39.24 | L3 | −16.6 | |
| 6 | 9.84 | 5.38 | | | | | |
| 7 | INF | 1.6 | | | Aperture stop | | |
| 8 | −16.611 | 2.6 | 1.56732 | 42.82 | L4 | −29.5 | 21.6 |
| 9 | −1000 | 1.05 | | | | | |
| 10 | −62.21 | 8.0 | 1.69100 | 54.82 | L5 | 58.3 | |
| 11 | −25.853 | 0.7 | | | | | |
| 12 | 44.498 | 9.5 | 1.60300 | 65.44 | L6 | 27.2 | |
| 13 | −24.08 | 1.2 | | | | | |
| 14 | −31.25 | 1.82 | 1.62004 | 36.26 | L7 | −23.0 | |
| 15 | 27.375 | 2.23 | | | | | |
| 16 | 41.072 | 4.74 | 1.60300 | 65.44 | L8 | 32.3 | |
| 17 | −35.8 | 0.7 | | | | | |
| 18 | 33.969 | 3.93 | 1.51633 | 64.14 | L9 | 59.2 | |
| 19 | −315 | 1.38 | | | | | |
| 20 | INF | 20 | 1.58913 | 61.14 | Pz | — | — |
| 21 | INF | 6.0 | | | | | |
| 22 | INF | 1.1 | 1.51823 | 58.90 | CG | — | — |
| 23 | INF | 3.95 | | | | | |
| 24 | INF | — | | | | | |

Note that the interval between lenses is one in the case where "the projection distance is 303 mm". "INF" in Table 1 denotes an infinite.

Numerical values about each condition in Example 1 are represented in Table 2.

TABLE 2

| | Condition | Numerical value |
|---|---|---|
| | T | 303 mm |
| | S | 150 mm |
| (1) | S/T | 0.50 |
| (2) | 2ω | 23.3° |
| (3) | 1/|F1| (1/mm) | 2.9E−0.3 |
| | 2GNR1 | −31.25 |
| | 2GPR2 | −24.08 |
| (4) | 2GPR2/2GNR1 | 0.77 |
| (5) | LPα | 74 |
| (6) | LCα | 86 |

An aberration diagram of the projection optical system of Example 1 is represented in FIG. 3. The spherical aberration (SA), astigmatism (AS) and distortion (Dist) are represented sequentially from the left in FIG. 3. In the diagram of spherical aberration (SA), R denotes the spherical aberration of red (whose wavelength is 625 nm), G denotes the spherical aberration of green (whose wavelength is 550 nm) and B denotes the spherical aberration of blue (whose wavelength is 460 nm). In the diagram of astigmatism (AS), S denotes the astigmatism of a sagittal image surface and T denotes the astigmatism of a tangential image surface. As represented in FIG. 3, the aberration is corrected.

Example 2

As illustrated in FIG. 4, lenses L1 to L9 are arranged sequentially from the magnifying side (the left side in FIG. 4) toward the reducing side and an aperture stop is set between the lens L3 and the lens L4.

A prism Pz is set on the reducing side with respect to the lens L9 and an image display screen S24 of an image display device is positioned on the reducing side with respect to the prism Pz via a cover glass CG.

The lenses L1 to L9 including the aperture stop are moved integrally and simultaneously to perform focus adjustment.

The lenses L1 to L3 are arranged on the magnifying side with respect to the aperture stop and the combined refractive power of the lenses L1 to L3 is negative.

In other words, on the magnifying side with respect to the aperture stop, the positive meniscus lens L1 having a concave surface on the magnifying side, the positive meniscus lens L2 having a convex surface on the magnifying side, and the bi-concave negative lens L3, are arranged sequentially from the most magnifying side.

Lenses L4 to L9 are arranged on the reducing side with respect to the aperture stop and the synthesized refractive power of the lenses L4 to L9 is positive.

In other words, on the reducing side with respect to the aperture stop, the bi-concave negative lens L4, the bi-convex positive lens L5, the bi-convex positive lens L6, the bi-concave negative lens L7, the bi-convex positive lens L8, and the positive meniscus lens L9 having a convex surface on the magnifying side, are arranged sequentially from the most magnifying side.

On the reducing side with respect to the lens L9, the prism Pz, the cover glass CG of the image display device, and the image display surface (S24) are arranged. The prism Pz plays a role to turn the light path and thus it is possible to reflect the imaging light bundle from the image display device on the prism Pz to cause the imaging light bundle to be incident on and emitted to the projection optical system. It is possible to set, as the prism Pz, a cross prism, a TIR prism, a RTIR prism, or the like according to the type of the display device.

The lenses L1 to L9 are all single spherical lenses and there is no cemented lens.

Each numerical value of Example 2 is represented in Table 3 after Table 1.

TABLE 3

F = 34.4 mm, Fno = 2.2, ω = 10.5°

| S | R | D | Nd | vd | L | f | FF |
|---|---|---|---|---|---|---|---|
| 1 | −550.00 | 3.00 | 1.80610 | 33.27 | L1 | 77.9 | −212.5 |
| 2 | −57.17 | 0.70 | | | | | |
| 3 | 39.84 | 9.50 | 1.80400 | 46.58 | L2 | 90.1 | |
| 4 | 78.19 | 3.89 | | | | | |
| 5 | −30.36 | 4.50 | 1.59551 | 39.24 | L3 | −23.6 | |
| 6 | 28.09 | 1.39 | | | | | |
| 7 | INF | 2.95 | | | Aperture stop | | |
| 8 | −28.09 | 4.50 | 1.59551 | 39.24 | L4 | −23.6 | 24.0 |
| 9 | 30.36 | 2.17 | | | | | |
| 10 | 29.06 | 4.76 | 1.65160 | 58.55 | L5 | 23.1 | |
| 11 | −29.71 | 2.02 | | | | | |
| 12 | 29.06 | 4.76 | 1.65160 | 58.55 | L6 | 23.1 | |
| 13 | −29.71 | 1.79 | | | | | |
| 14 | −20.20 | 1.65 | 1.59270 | 35.31 | L7 | −16.6 | |
| 15 | 20.20 | 4.00 | | | | | |
| 16 | 38.51 | 8.40 | 1.60300 | 65.44 | L8 | 33.1 | |
| 17 | −38.51 | 0.70 | | | | | |
| 18 | 57.17 | 3.00 | 1.80610 | 33.27 | L9 | 77.9 | |
| 19 | 555.00 | 1.73 | | | | | |
| 20 | INF | 20.00 | 1.58913 | 61.14 | Pz | — | — |
| 21 | INF | 6.0 | | | | | |
| 22 | INF | 1.10 | 1.51823 | 58.90 | CG | — | — |
| 23 | INF | 3.95 | | | | | |
| 24 | INF | 0.00 | | | | | |

The interval between lenses is one in the case where "the projection distance is 303 mm".

Numerical values about each condition in Example 2 are represented in Table 2.

TABLE 4

| | Condition | Numerical value |
|---|---|---|
| | T | 303 mm |
| | S | 135 mm |
| (1) | S/T | 0.45 |
| (2) | 2ω | 21.0° |
| (3) | 1/|F1| (1/mm) | 4.7E−03 |
| | 2GNR1 | −20.20 |
| | 2GPR2 | −29.71 |
| (4) | 2GPR2/2GNR1 | 1.47 |
| (5) | LPα | 91 |
| (6) | LCα | 91 |

Figure 5:
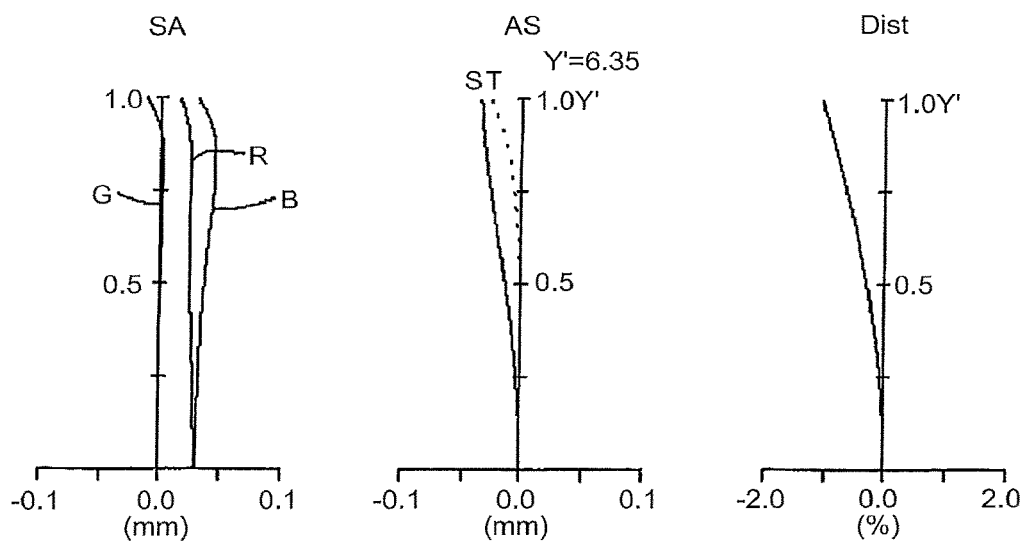
FIG. 5 is an aberration curve diagram representing the spherical aberration (SA), astigmatism (AS) and distortion (Dist) of the projection optical system Example 2.

An aberration diagram of the projection optical system of Example 2 is represented in FIG. 5 after FIG. 3

Example 3

As illustrated in FIG. 6, lenses L1 to L8 are arranged sequentially from the magnifying side (the left side in FIG. 6) and an aperture stop is set between the lens L2 and the lens L3.

A prism Pz is set on the reducing side with respect to the lens L8 and an image display screen S22 of an image display device is positioned on the reducing side with respect to the prism Pz via a cover glass CG.

The lenses L1 to L8 together with the aperture stop are moved integrally and simultaneously to perform focus adjustment.

The lenses L1 and L2 are arranged on the magnifying side with respect to the aperture stop and the combined refractive power of the lenses L1 and L2 is negative.

In other words, on the magnifying side with respect to the aperture stop, the positive meniscus lens L1 having a concave surface on the magnifying side and the bi-concave negative meniscus lens L2, are arranged sequentially from the most magnifying side.

The lenses L3 to L8 are arranged on the reducing side with respect to the aperture stop and the synthesized refractive power of the lenses L3 to L8 is positive.

In other words, on the reducing side with respect to the aperture stop, the bi-convex negative lens L3, the bi-convex positive lens L4, the bi-convex positive lens L5, the bi-concave negative lens L6, the bi-convex positive lens L7, and the positive meniscus lens L8 having a convex surface on the magnifying side, are arranged sequentially from the most magnifying side.

On the reducing side with respect to the lens L8, the prism Pz, the cover glass CG of the image display device and the image display surface (S22) are arranged. The prism Pz plays a role to turn the light path and thus it is possible to reflect the imaging light bundle from the image display device on the prism Pz to cause the imaging light bundle to be incident on and emitted to the projection optical system. It is possible to set, as the prism Pz, a cross prism, a TIR prism, a RTIR prism, or the like, according to the type of the display device.

The lenses L1 to L8 are all single spherical lenses and there is no cemented lens.

Each numerical value of Example 3 is represented in Table 5 after Table 1.

TABLE 5

F = 31.4 mm, Fno = 2.2, ω = 11.5°

| S | R | D | Nd | vd | L | f | FF |
|---|---|---|---|---|---|---|---|
| 1 | −550.00 | 6.00 | 1.80400 | 46.58 | L1 | 90.2 | −60.6 |
| 2 | −64.19 | 15.05 | | | | | |
| 3 | −21.90 | 5.52 | 1.51633 | 64.14 | L2 | −30.0 | |
| 4 | 58.78 | 1.15 | | | | | |
| 5 | INF | 1.51 | | | Aperture stop | | |
| 6 | −30.70 | 2.63 | 1.51633 | 64.14 | L3 | −25.6 | 27.2 |
| 7 | 24.18 | 2.28 | | | | | |
| 8 | 33.93 | 8.00 | 1.65160 | 58.55 | L4 | 24.3 | |
| 9 | −27.21 | 2.66 | | | | | |
| 10 | 29.83 | 7.88 | 1.65160 | 58.55 | L5 | 22.4 | |
| 11 | −26.00 | 1.01 | | | | | |
| 12 | −22.20 | 8.89 | 1.64769 | 33.79 | L6 | −15.4 | |
| 13 | 21.47 | 3.34 | | | | | |
| 14 | 31.51 | 5.44 | 1.48749 | 70.24 | L7 | 33.8 | |
| 15 | −33.05 | 8.47 | | | | | |
| 16 | 49.31 | 2.59 | 1.80400 | 46.58 | L8 | 82.3 | |
| 17 | 184.41 | 1.77 | | | | | |
| 18 | INF | 20 | 1.58913 | 61.14 | Pz | — | |
| 19 | INF | 6 | | | | | |
| 20 | INF | 1.1 | 1.51823 | 58.90 | CG | — | — |
| 21 | INF | 3.95 | | | | | |
| 22 | INF | 0 | | | | | |

The interval between lenses is one in the case where "the projection distance is 303 mm".

Numerical values about each condition in Example 3 are represented in Table 6.

TABLE 6

| | Condition | Numerical value |
|---|---|---|
| | T | 303 mm |
| | S | 149.8 mm |
| (1) | S/T | 0.49 |

TABLE 6-continued

| | Condition | Numerical value |
|---|---|---|
| (2) | 2ω | 23.0° |
| (3) | 1/|F1| (1/mm) | 1.7E−02 |
| | 2GNR1 | −22.20 |
| | 2GPR2 | −26.00 |
| (4) | 2GPR2/2GNR1 | 1.17 |
| (5) | LPα | 74 |
| (6) | LCα | 74 |

Figure 7:
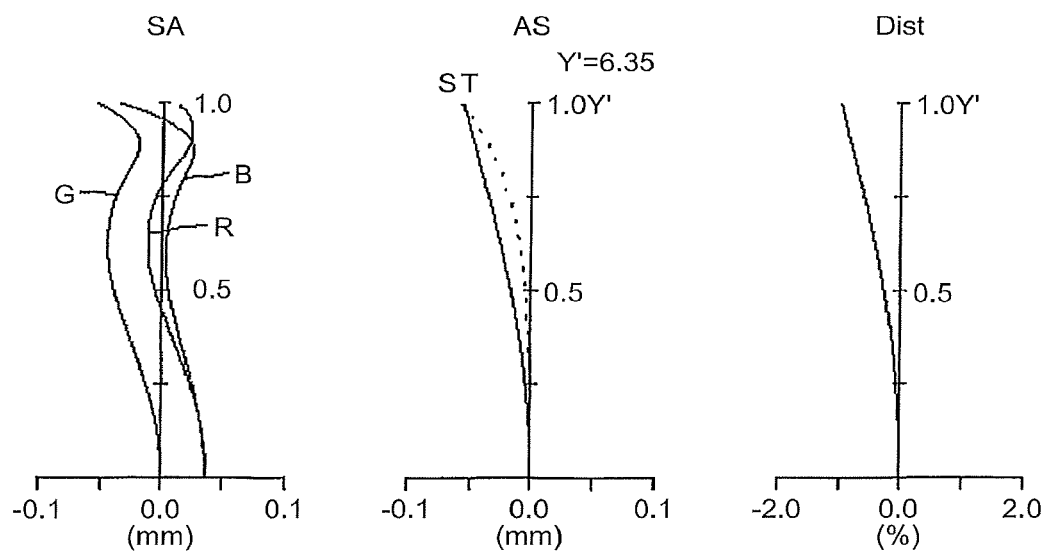
FIG. 7 is an aberration curve diagram representing the spherical aberration (SA), astigmatism (AS) and distortion (Dist) of the projection optical system according to Example 3.

An aberration diagram of the projection optical system of Example 3 is represented in FIG. 7 after FIG. 3.

Example 4

As illustrated in FIG. 8, lenses L1 to L8 are arranged sequentially from the magnifying side (the left side in FIG. 8), an aperture stop is set between the lens L3 and the lens L4, a prism Pz is set on the reducing side with respect to the lens L8 and an image display screen S22 of an image display device is positioned on the reducing side with respect to the prism Pz via a cover glass CG.

The lenses L1 to L8 together with the aperture stop are moved integrally and simultaneously to perform focus adjustment.

The lenses L1 to L3 are arranged on the magnifying side with respect to the aperture stop and the combined refractive power of the lenses L1 to L3 is negative.

In other words, on the magnifying side with respect to the aperture stop, the positive meniscus lens L1 having a concave surface on the magnifying side, the positive meniscus lens L2 having a convex surface on the magnifying side, and the bi-concave negative lens L3, are arranged sequentially from the most magnifying side.

Lenses L4 to L8 are arranged on the reducing side with respect to the aperture stop and the synthesized refractive power of the lenses L4 to L8 is positive.

In other words, on the reducing side with respect to the aperture stop, the bi-concave negative lens L4, the bi-convex positive lens L5, the bi-convex positive lens L6, the bi-concave negative lens L7, and the bi-convex positive lens L8, are arranged sequentially from the most magnifying side.

On the reducing side with respect to the lens L8, the prism Pz, the cover glass CG of the image display device, and the image display surface (S22) are arranged. The prism Pz plays a role to turn the light path and thus it is possible to reflect the imaging light bundle from the image display device on the prism Pz to cause the imaging light bundle to be incident on and emitted to the projection optical system. It is possible to set, as the prism Pz, a cross prism, a TIR prism, or a RTIR prism according to the type of the display device.

The lenses L1 to L8 are all single spherical lenses and there is no cemented lens.

Each numerical value of Example 4 is represented in Table 7 after Table 1.

TABLE 7

F = 31.0 mm, Fno = 2.2, ω = 11.7°

| S | R | D | Nd | vd | L | f | FF |
|---|---|---|---|---|---|---|---|
| 1 | −340.00 | 6.00 | 1.80400 | 46.58 | L1 | 93.3 | −220.7 |
| 2 | −62.37 | 0.70 | | | | | |
| 3 | 20.82 | 4.66 | 1.80400 | 46.58 | L2 | 34.1 | |

TABLE 7-continued

F = 31.0 mm, Fno = 2.2, ω = 11.7°

| S | R | D | Nd | vd | L | f | FF |
|---|---|---|---|---|---|---|---|
| 4 | 75.99 | 3.54 | | | | | |
| 5 | −77.02 | 1.20 | 1.59551 | 39.24 | L3 | −15.7 | |
| 6 | 10.80 | 4.39 | | | | | |
| 7 | INF | 2.92 | | | Aperture stop | | |
| 8 | −29.88 | 4.50 | 1.56732 | 42.82 | L4 | −37.9 | 22.2 |
| 9 | 83.42 | 1.21 | | | | | |
| 10 | 1541.69 | 8.00 | 1.69100 | 54.82 | L5 | 30.4 | |
| 11 | −21.44 | 2.20 | | | | | |
| 12 | 29.66 | 5.25 | 1.60300 | 65.44 | L6 | 21.8 | |
| 13 | −22.26 | 0.92 | | | | | |
| 14 | −21.38 | 1.50 | 1.62004 | 36.26 | L7 | −16.4 | |
| 15 | 21.05 | 4.31 | | | | | |
| 16 | 35.82 | 5.81 | 1.71300 | 53.87 | L8 | 24.9 | |
| 17 | −33.32 | 1.37 | | | | | |
| 18 | INF | 20.00 | 1.58913 | 61.14 | Pz | — | |
| 19 | INF | 6.00 | | | | | |
| 20 | INF | 1.10 | 1.51823 | 58.90 | CG | — | |
| 21 | INF | 3.95 | | | | | |
| 22 | INF | 0.00 | | | | | |

The interval between lenses is one in the case where "the projection distance is 303 mm".

Numerical values about each condition in Example 4 are represented in Table 8.

TABLE 8

| | Condition | Numerical value |
|---|---|---|
| | T | 303 mm |
| | S | 150 mm |
| (1) | S/T | 0.50 |
| (2) | 2ω | 23.4° |
| (3) | 1/|F1| (1/mm) | 4.5E−02 |
| | 2GNR1 | −21.38 |
| | 2GPR2 | −22.26 |
| (4) | 2GPR2/2GNR1 | 1.04 |
| (5) | LPα | 74 |
| (6) | LCα | 74 |

Figure 9:
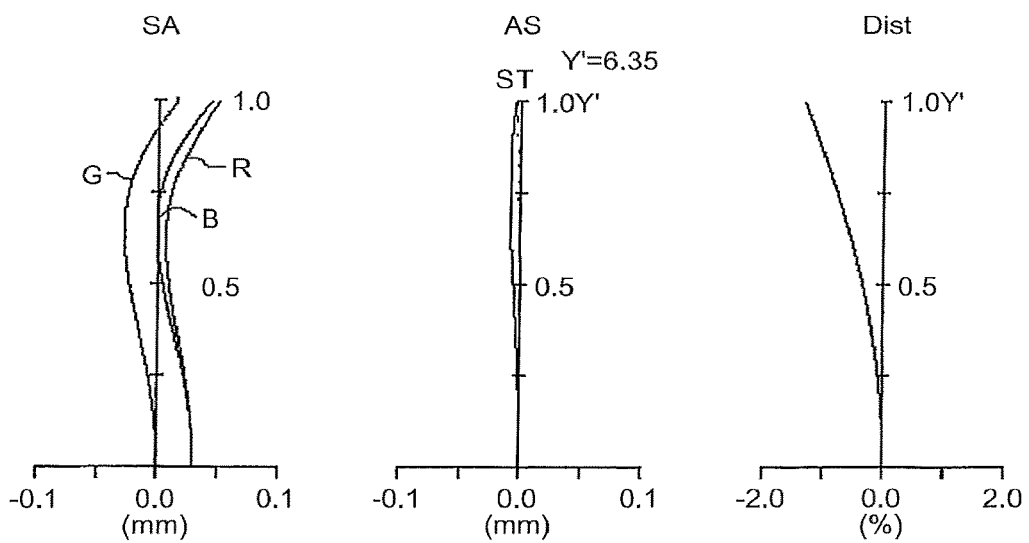
FIG. 9 is an aberration curve diagrams representing the spherical aberration (SA), astigmatism (AS) and distortion (Dist) of the projection optical system according to Example 4.

An aberration diagram of the projection optical system of Example 4 is represented in FIG. 9 after FIG. 3.

Example 5

As illustrated in FIG. 10, lenses L1 to L7 are arranged sequentially from the magnifying side (the left side in FIG. 10), an aperture stop is set between the lens L2 and the lens L3, a prism Pz is set on the reducing side with respect to the lens L7 and an image display screen S20 of an image display device is positioned on the reducing side with respect to the prism Pz via a cover glass CG.

The lenses L1 to L7 together with the aperture stop are moved integrally and simultaneously to perform focus adjustment.

The lenses L1 and L2 are arranged on the magnifying side with respect to the aperture stop and the combined refractive power of the lenses L1 and L2 is negative.

In other words, on the reducing side with respect to the aperture stop, the positive meniscus lens L1 having a concave surface on the magnifying side and the bi-concave negative lens L2, are arranged sequentially from the most magnifying side.

The lenses L3 to L7 are arranged on the reducing side with respect to the aperture stop and the synthesized refractive power of the lenses L3 to L7 is positive.

In other words, on the reducing side with respect to the aperture stop, the bi-concave negative lens L3, the bi-convex positive lens L4, the bi-convex positive lens L5, the bi-concave negative lens L6, and the bi-convex positive lens L7, which are lenses arranged sequentially from the most magnifying side.

On the reducing side with respect to the lens L8, the prism Pz, the cover glass CG of the image display device, and the image display surface (S20) are arranged. The prism Pz plays a role to turn the light path and thus it is possible to reflect the imaging light bundle from the image display device on the prism Pz to cause the imaging light bundle to be incident on and emitted to the projection optical system. It is possible to set, as the prism Pz, a cross prism, a TIR prism, a RTIR prism, or the like, according to the type of the display device.

The lenses L1 to L7 are all single spherical lenses and there is no cemented lens.

Each numerical value of Example 5 is represented in Table 9 after Table 1.

TABLE 9

F = 31.3 mm, Fno = 2.2, ω = 11.6°

| S | R | D | Nd | vd | L | f | FF |
|---|---|---|---|---|---|---|---|
| 1 | −500.00 | 6.00 | 1.80440 | 39.59 | L1 | 76.2 | −134.9 |
| 2 | −55.42 | 11.58 | | | | | |
| 3 | −21.67 | 9.50 | 1.51633 | 64.14 | L2 | −41.6 | |
| 4 | 7232.91 | 0.80 | | | | | |
| 5 | INF | 1.62 | | | Aperture stop | | |
| 6 | −25.67 | 2.87 | 1.54814 | 45.78 | L3 | −20.5 | 28.0 |
| 7 | 21.08 | 2.25 | | | | | |
| 8 | 29.89 | 7.78 | 1.65160 | 58.55 | L4 | 20.7 | |
| 9 | −22.33 | 8.79 | | | | | |
| 10 | 28.32 | 8.00 | 1.64000 | 60.08 | L5 | 24.7 | |
| 11 | −32.40 | 1.09 | | | | | |
| 12 | −24.53 | 9.50 | 1.67270 | 32.10 | L6 | −15.6 | |
| 13 | 21.61 | 4.22 | | | | | |
| 14 | 34.87 | 7.11 | 1.80400 | 46.58 | L7 | 26.1 | |
| 15 | −49.15 | 1.39 | | | | | |
| 16 | INF | 20.00 | 1.58913 | 61.14 | Pz | — | — |
| 17 | INF | 6.00 | | | | | |
| 18 | INF | 1.10 | 1.51823 | 58.90 | CG | — | — |
| 19 | INF | 3.95 | | | | | |
| 20 | INF | 0.00 | | | | | |

The interval between lenses is one in the case where "the projection distance is 303 mm".

TABLE 10

| | Condition | Numerical value |
|---|---|---|
| | T | 303 mm |
| | S | 150 mm |
| (1) | S/T | 0.50 |
| (2) | 2ω | 23.2° |
| (3) | 1/|F1| (1/mm) | 7.3E−03 |
| | 2GNR1 | −24.53 |
| | 2GPR2 | −31.40 |
| (4) | 2GPR2/2GNR1 | 1.32 |
| (5) | LPα | 70 |
| (6) | LCα | 74 |

Figure 11:
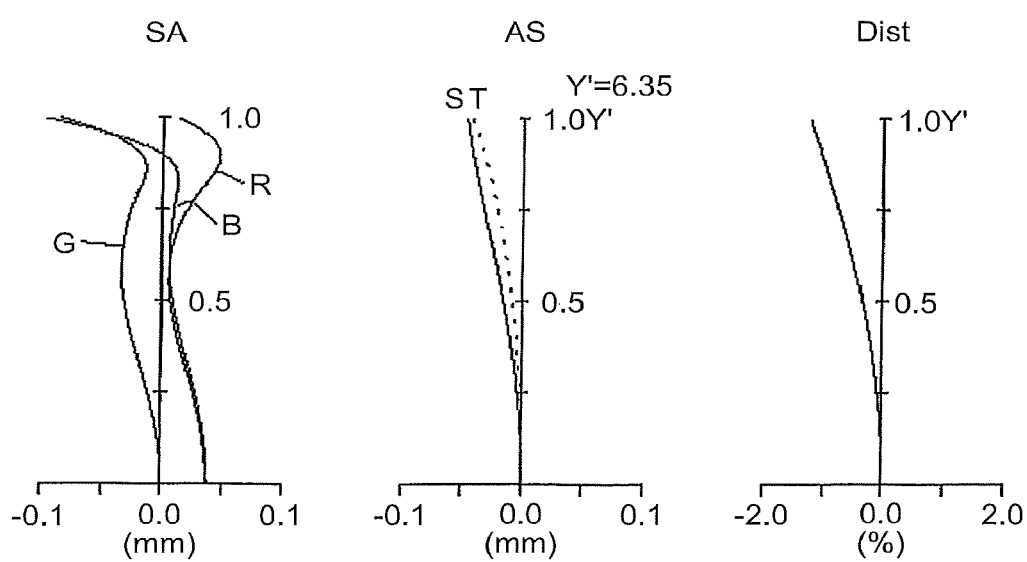
FIG. 11 is an aberration curve diagram representing the spherical aberration (SA), astigmatism (AS) and distortion (Dist) of the projection optical system according to Example 5.

An aberration diagram of the projection optical system of Example 5 is represented in FIG. 11 after FIG. 3.

As described above, in the projection optical system according to the present invention, the spherical aberration, astigmatism, field curvature, and axial chromatic aberration are sufficiently corrected and the distortion is also sufficiently corrected to be equal to or smaller than −2.0% as represented in each of the aberration diagrams in the specific configurations represented in First to Fifth Examples. It is clear from each of the examples that it is possible to keep preferable optical performances.

According to an embodiment, it is possible to realize a new projection optical system having resistance to the light intensity and temperature change.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A projection optical system for an image projection device, the projection optical system comprising:
a whole lens system of seven to nine lenses and an aperture stop, wherein
the seven to nine lenses are all single lenses,
a magnifying side with respect to the aperture stop consisting of, with respect to the lenses, one negative lens and one or two positive lenses,
two negative lenses and three or four positive lenses are located on a reducing side with respect to the aperture stop, and
a lens adjacent to the magnifying side of the aperture stop and a lens adjacent to the reducing side of the aperture stop are both a negative lens,
wherein an angle-of-view ω of the magnifying side satisfies a condition:

$2\omega < 25$ degrees.

2. The projection optical system according to claim 1, wherein a distance T (mm) from a surface on the magnifying side, of the lens on the most magnifying side, to a surface of a screen and a diagonal size S (mm) of a projection image projected onto the screen satisfies a condition:

$0.2 < S/T < 0.6$.

3. The projection optical system according to claim 1, wherein the magnifying side with respect to the aperture stop has a positive or negative power, the reducing side with respect to the aperture stop has a positive power, and a focal length F1 of a group of the lenses on the magnifying side with respect to the aperture stop satisfies a condition:

$1/|F1| < 2.0E\text{-}2 (1/mm)$.

4. The projection optical system according to claim 1, wherein the whole of the projection optical system are moved in the direction of an optical axis to perform focus adjustment.

5. An image projection device comprising:
a light source;
an image display device;
an optical illumination system configured to evenly emit beams from the light source to the image display device; and
the projection optical system according to claim 1.

6. The projection optical system according to claim 1, wherein:
a lens surface on the magnifying side, of the lens on a most magnifying side in the whole lens system, is a concave surface.

7. A projection optical system for an image projection device, the projection optical system comprising:
a whole lens system of seven to nine lenses and an aperture stop, wherein
the seven to nine lenses are all single lenses,
a magnifying side with respect to the aperture stop consisting of, with respect to the lenses, one negative lens and one or two positive lenses,
two negative lenses and three or four positive lenses are located on a reducing side with respect to the aperture stop,
a lens adjacent to the magnifying side of the aperture stop and a lens adjacent to the reducing side of the aperture stop are both a negative lens, and
wherein a curvature radius 2GNR1 on the magnifying side, of a negative lens on a most reducing side in the reducing side with respect to the aperture stop, and a curvature radius 2GPR2 on the reducing side, of a positive lens adjacent to the magnifying side of the negative lens satisfy a condition:

$1.1 < 2GPR2/2GNR1$ or $0.9 < 2GPR2/2GNR1$.

8. A projection optical system for an image projection device, the projection optical system comprising:
a whole lens system of seven to nine lenses and an aperture stop, wherein
the seven to nine lenses are all single lenses,
a magnifying side with respect to the aperture stop consisting of, with respect to the lenses, one negative lens and one or two positive lenses,
two negative lenses and three or four positive lenses are located on a reducing side with respect to the aperture stop, and
a lens adjacent to the magnifying side of the aperture stop and a lens adjacent to the reducing side of the aperture stop are both a negative lens,
wherein a linear expansion coefficient $LP\alpha$ ($10^{-7}/°$ C.) of a lens on the most magnifying side at 100 to 300° C. and a linear expansion coefficient $LC\alpha$ ($10^{-7}/°$ C.) of a lens on the most reducing side at 100 to 300° C. satisfy conditions:

$LP\alpha < 100 (10^{-7}/°$ C.$)$ and $LC\alpha < 100 (10^{-7}/°$ C.$)$.

* * * * *